United States Patent [19]

Miller

[11] Patent Number: 5,727,821
[45] Date of Patent: Mar. 17, 1998

[54] FLUID COUPLINGS

[75] Inventor: Barry Charles Miller, Egham, England

[73] Assignee: Smiths Industries PLC, London, England

[21] Appl. No.: 680,408

[22] Filed: Jul. 15, 1996

[30] Foreign Application Priority Data

Aug. 4, 1995 [GB] United Kingdom ............ 9516064

[51] Int. Cl.[6] .................... F16L 37/22; F16L 37/084
[52] U.S. Cl. .................... 285/318; 285/308; 285/321
[58] Field of Search ........................ 285/308, 318, 285/321

[56] References Cited

U.S. PATENT DOCUMENTS

| | | | |
|---|---|---|---|
| 2,182,797 | 12/1939 | Dillon | 285/308 |
| 3,909,046 | 9/1975 | Legris | 285/308 X |
| 3,922,011 | 11/1975 | Walters | 285/277 |
| 4,638,975 | 1/1987 | Iuchi et al. | 251/149.6 |
| 4,906,031 | 3/1990 | Vyse | 285/318 |
| 5,171,045 | 12/1992 | Pasbrig | 285/308 |
| 5,226,682 | 7/1993 | Marrison et al. | 285/308 |
| 5,284,369 | 2/1994 | Kitamura | 285/322 |
| 5,395,140 | 3/1995 | Wiethorn | 285/93 |
| 5,419,594 | 5/1995 | Nelms | 285/321 X |
| 5,570,910 | 11/1996 | Highlen | 285/308 |

FOREIGN PATENT DOCUMENTS

| | | | |
|---|---|---|---|
| 683011 | 3/1964 | Canada | 285/318 |
| 1277984 | 10/1961 | France | 285/318 |
| 628517 | 8/1949 | United Kingdom. | |
| WO 88/08938 | 11/1988 | WIPO. | |

*Primary Examiner*—John A. Ricci
*Attorney, Agent, or Firm*—Pollock, Vande Sande & Priddy

[57] ABSTRACT

A fluid coupling has a male part that can be mated with a female part. The female part has an O-ring seal that seals with the outside of the male part. A helical retaining ring is located in a groove in the female part and engages behind a shoulder projecting from the male part. The groove has an inclined wall so that a withdrawing force applied to the male part causes the retaining ring to be forced into closer contact with the male part. A release ring extends around the female part at its forward end and is urged forwardly by a resilient wave washer. The release ring engages the retaining ring when it is pushed rearwardly so that the retaining ring is held away from the inclined wall enabling it to be expanded by the shoulder when the male part is withdrawn.

8 Claims, 2 Drawing Sheets

FLUID COUPLINGS

BACKGROUND OF THE INVENTION

This invention relates to fluid couplings.

The invention is more particularly concerned with fluid couplings that can be easily connected and disconnected, without the need for tools.

There are many applications where it is desirable to be able to make a quick connection or disconnection between two fluid lines, such as, for example, in automotive applications, and in hydraulic or pneumatic circuits.

Problems exist with conventional quick release couplings. They can be prone to accidental disconnection and they may leak after prolonged use or repeated connection and disconnection.

BRIEF SUMMARY OF THE INVENTION

It is an object of the present invention to provide a coupling that can be used to alleviate these problems.

According to the present invention there is provided a fluid coupling comprising a female part and a male part having a forward end that is insertable within a forward end of the female part, the female part having a bore, an annular sealing member located in the bore and an annular retaining ring located in a groove, the male part having a nose portion the outer surface of which is adapted to engage and seal with the sealing member, and an outwardly-projecting shoulder such that the retaining ring is displaced outwardly into the groove by engagement with a forward surface of the shoulder and engages behind the shoulder to prevent withdrawal, and the coupling having a release member that is movable to engage the retaining ring and enable it to be displaced outwardly to clear the shoulder.

The release member may be a ring mounted at the forward end of the female part. The groove preferably has an inclined wall at its forward end such that when a force is applied to separate the two parts, the shoulder of the male part pushes the retaining ring against the inclined surface of the groove to urge the retaining ring into closer contact with the male part. The release ring is preferably adapted to hold the retaining ring rearwardly away from the inclined wall so that the retaining ring can expand outwardly when the shoulder of the male part is pulled forwardly against the retaining ring. The release member preferably includes a resilient member, such as a wave washer, adapted to urge the release member forwardly. The forward surface of the shoulder may be inclined and the rear surface of the shoulder be steep. The retaining ring may be a helical spring.

A fluid coupling according to the present invention will now be described, by way of example, with reference to the accompanying drawing.

DETAILED DESCRIPTION OF THE PREFERRED EMBODIMENT

Figure 1:
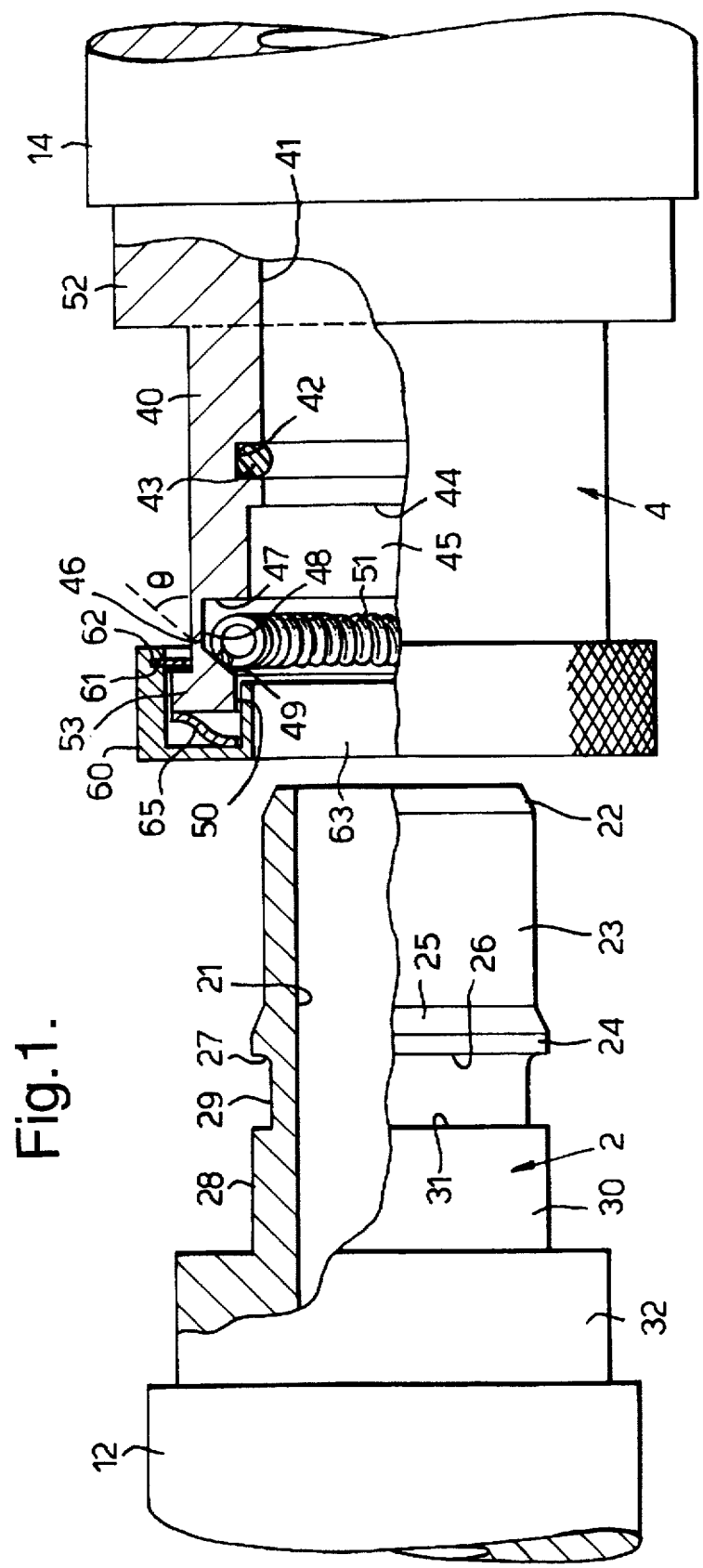
FIG. 1 is a sectional side elevation of the coupling with its two parts separated.

The coupling is in two parts: a male part 2, shown on the left, and a female part 4, shown on the right. The two parts 2 and 4 are attached at their rear to the ends of respective hoses 12 and 14 through which water, oil or other fluid is supplied. The forward ends of each part 2 and 4 are open.

The male part 2 is machined from aluminum and is a spigot of cylindrical shape with a smooth central bore 21 of circular shape, which communicates with the interior of the hose 12. Externally, the male part 2 has a short tapered bevel 22 at its forward end and a smooth nose portion 23 of circular shape and constant diameter, which extends rearwardly from the bevel by a distance approximately equal to its external diameter. At the rear of the nose portion 23 projects a shoulder 24 having an inclined leading edge 25 and a steep, right-angle rear edge 26 with a rounded inner corner 27. Rearwardly of the shoulder 24, the male part 2 has a stepped cylindrical section 28, with a diameter at its forward end 29 equal to that of the nose portion 23, and diameter at its rear end 30 equal to that of the shoulder 24. The forward and rear ends 29 and 30 are separated by a right-angle step 31. The male part 2 is completed by a rear section 32 of increased diameter, onto which the hose 12 is secured.

The female part 4 has a machined aluminum body 40 with a central bore 41 of circular shape. At its rear, right-hand end, the diameter of the bore 41 is slightly greater than the external diameter of the nose portion 23 on the male part 2, so that this is a close sliding fit within the rear end of the bore. A groove 42 extends around the bore 41 and retains an O-ring seal 43 of a resilient, elastomeric material. The seal 43 is a close fit in the groove 42 and, in its natural state, before insertion of the male part 2, projects inwardly of the bore 41. Just forwardly of the groove 42, the bore 41 has a step 44 to an enlarged forward region 45 with a diameter slightly greater than that of the shoulder 24 on the male part 2, so that this is a close sliding fit within the enlarged region. A second groove 46 is located at the forward end of the region 45. The forward groove 46 has a rear wall 47, extending at right angles to the axis of the female part 4, and a coaxial floor 48. The forward wall 49 of the groove 46 is about half the height of the rear wall 47 and is inclined to the axis of the coupling at an angle θ of about 45°. The forward wall 49 is spaced from the forward end of the body 40 by a short forward region 50.

A retaining ring 51 is located in the forward groove 46. The retaining ring 51 is an expansible stainless steel helical spring formed into a circular iris, and shaped by joining its opposite ends together, such as by welding or overlapping and retaining together with a plastic insert, not shown. In its natural state, before insertion of the male part 2, the external diameter of the ring 51 is slightly less than the maximum diameter of the groove 46, so that it can be expanded radially. The inner surface of the ring 51 projects inwardly into the bore 41, its diameter being approximately equal to the external diameter of the nose portion 23 of the male part 2.

Externally, the body 40 has an enlarged rear section 52, onto which the hose 14 is mounted, and a flange 53 projecting radially outwardly around its forward end. A release ring 60 of U shape in section encloses the forward end of the body 40. The ring 60 is retained on the flange 53 by means of a circlip 61, which lies in an internal groove 62 close to the rear end of ring and which engages the rear face of the flange. The release ring 60 has an inner sleeve 63 projecting rearwardly into the forward end of the body 40, the sleeve having a diameter approximately equal to the diameter of the ring 51 at its thickest part. The ring 60 is urged forwardly by resilient means 65, such as a wave washer spring, Belleville washer or the like. In its natural position, with the circlip 61 abutting the rear of the flange 53, the rear end of the sleeve 63 lies at the junction between the rear of the forward region 50 and the forward end of the inclined wall 49 of the groove 46. The outer surface of the release ring 60 is knurled to improve grip.

Figure 2:
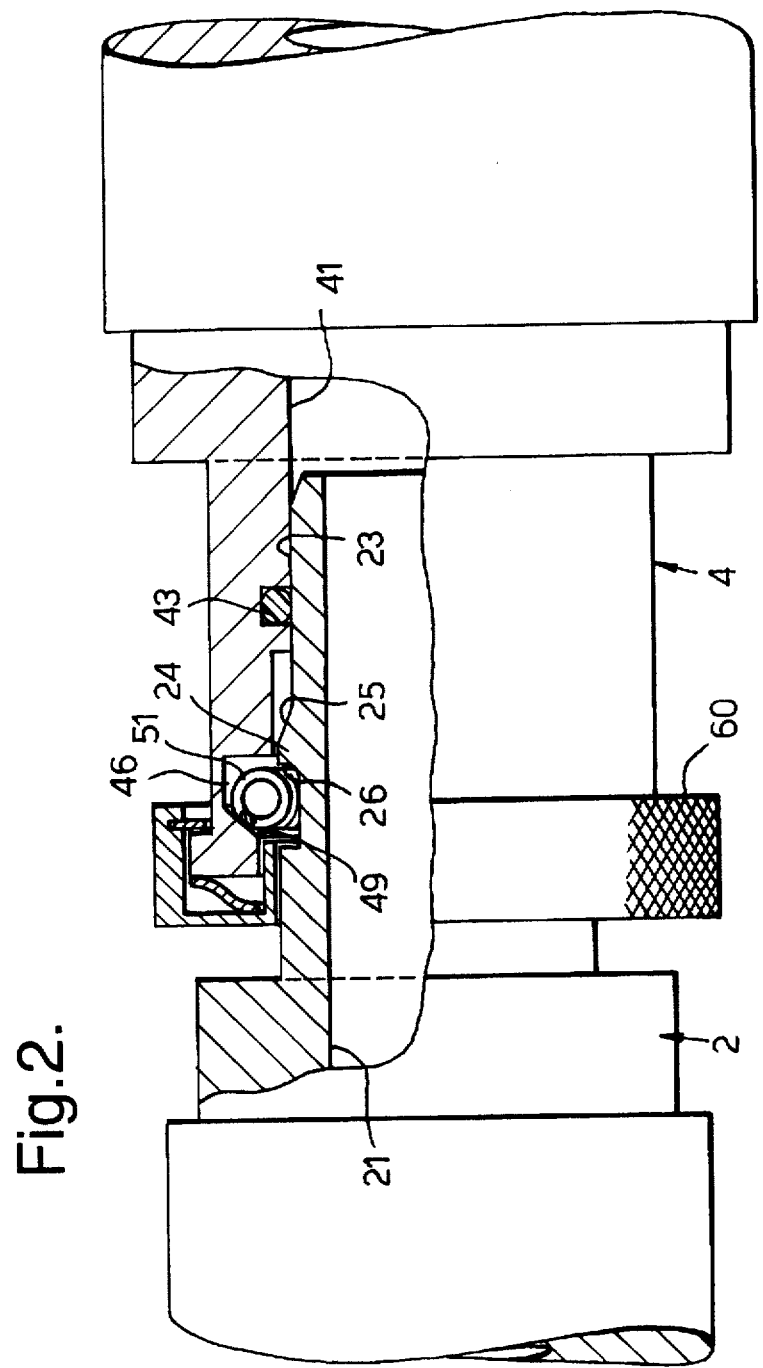
FIG. 2 is a sectional side elevation of the coupling with its two parts mated.

The two parts 2 and 4 are mated by pushing the forward end of the male part 2 into the forward part of the female part 4, which is assisted by the bevel 22 on the male part. The nose 23 on the male part 2 can slide freely within the retaining ring 51. Further insertion brings the forward end of the male part 2 into the rear part of the bore 41 and the O-ring seal 43 makes a close, sliding seal with the outside of the nose 23. At the same time, the leading edge 25 of the shoulder 24 on the male part 2 engages the retaining ring 51 and acts as an expansion land to urge the ring outwardly. As the male part 2 is inserted further, the retaining ring 51 snaps behind the rear edge 26 of the shoulder 24. In this position, as shown in FIG. 2, the two parts 2 and 4 of the coupling are fully mated. The O-ring seal 43 prevents leakage of fluid between the inside of the female part 4 and the outside of the male part 2, so that flow of fluid is confined to the bores 21 and 41. Withdrawal of the male part 2 from the female part 4 is prevented by the retaining ring 51. If force is applied to separate the two parts 2 and 4 of the coupling, the rear edge 26 of the shoulder 24 will engage the rear side of the ring 51 and move it forwardly relative to the female part. This will cause the forward side of the ring 51 to engage the inclined wall 49 of the groove 46, thereby urging the ring inwardly into tighter engagement with the male part 2. The clearance between the outside of the male part 2 and the inside of the female part 4 at the forward end of the female part is considerably less than the thickness of the ring 51, so the ring cannot be pulled out of the female part while the male part is inserted.

To uncouple the two parts 2 and 4 from one another, the release ring 60 is gripped and pushed to the right, that is, rearwardly of the female part 4. This brings the rear end of the sleeve 63 into contact with the forward surface of the retaining ring 51 so as to hold the retaining ring in the rear part of the groove, away from the inclined wall 49. When the male part 2 is pulled to the left, the rear edge 26 of its shoulder 24 engages the ring 51. Because the ring 51 is held in the larger part of the groove 46, it can expand to allow the shoulder 24 to pass through the ring. The load required to pull the shoulder 24 out of the ring 51 is greater than that required for assembly, because the rear surface 26 of the shoulder does not have an incline as does the front surface 25. However, the circular shape of the retaining ring 51 and the radius of the rounded corner 27, which is the same as that of the ring, is such as to allow the ring to ride outwardly over the outer edge of the rear surface 26 of the shoulder 24, so as to enable the male part 2 to be pulled out of the female part 4.

The coupling of the present invention provides a secure retention and a leak-proof operation, even after repeated insertions and withdrawals.

What I claim is:

1. A fluid coupling comprising: a female part, said female part having a bore, an annular sealing member located in the bore, a groove around the bore and an annular retaining ring located in said groove; and a male part, said male part having a nose portion at its forward end and an outwardly-projecting shoulder on said nose portion, and said shoulder having a forward surface and a rear surface, wherein said nose portion is insertable within said bore at a forward end of said female part so that an outer surface of said nose portion engages and seals with said sealing member, and said forward surface of said shoulder engages said retaining ring and displaces said ring outwardly into said groove, said ring engaging behind said shoulder to prevent withdrawal, and wherein said coupling has a release member, said release member including a resilient member that urges said release member forwardly, said release member being movable to engage said retaining ring and enable it to be displaced outwardly to clear said shoulder.

2. A coupling according to claim 1, wherein said release member is a ring mounted at the forward end of said female part.

3. A coupling according to claim 1 or 2, wherein said groove has an inclined wall at its forward end such that when a force is applied to separate said male and female parts, said shoulder pushes said retaining ring against said inclined wall and urges said retaining ring into closer contact with said male part.

4. A coupling according to claim 3, wherein said release member is arranged to hold said retaining ring rearwardly away from said inclined wall, when said release member is displaced, so that said retaining ring can expand outwardly when said shoulder of said male part is pulled forwardly against said retaining ring.

5. A coupling according to claim 1, wherein said resilient member is a wave washer.

6. A coupling according to claim 1, wherein said forward surface of said shoulder is inclined and said rear surface of said shoulder is steep.

7. A coupling according to claim 1, wherein said retaining ring is a helical spring.

8. A fluid coupling comprising: a female part, said female part having a bore, an annular sealing member located in the bore, a groove around the bore and an annular retaining ring located in said groove; and a male part, said male part having a nose portion at its forward end and an outwardly-projecting shoulder on said nose portion, and said shoulder having a forward surface and a rear surface, wherein said nose portion is insertable within said bore at a forward end of said female part so that an outer surface of said nose portion engages and seals with said sealing member, and said forward surface of said shoulder engages said retaining ring and displaces said ring outwardly into said groove, said ring engaging behind said shoulder to prevent withdrawal, wherein said groove has an inclined wall at its forward end such that when a force is applied to separate said two parts, said shoulder of said male part pushes said retaining ring against said inclined wall and urges said retaining ring into closer contact with said male part, and wherein said female part has a release ring mounted at its forward end, said release ring including a resilient member urging said ring to a forward position, and said release member being displaceable rearwardly to engage said retaining ring hold it away from said inclined wall of said groove thereby enabling the ring to be displaced outwardly into said groove to clear said shoulder.

* * * * *